United States Patent Office.

EMILE RAYNAUD, OF TESSENDERLOO, BELGIUM.

METHOD OF OBTAINING ALUMINA FROM ITS ORES.

SPECIFICATION forming part of Letters Patent No. 650,763, dated May 29, 1900.

Application filed October 24, 1898. Serial No. 694,463. (No specimens.)

*To all whom it may concern:*

Be it known that I, EMILE RAYNAUD, a Belgian subject, residing at Tessenderloo, Belgium, have invented a new and useful Process of Extracting Alumina from Aluminous Ores, (for which I have applied for patents in Belgium, dated March 25, 1898, No. 134,625; in Germany, dated March 28, 1898; in Luxemburg, dated September 23, 1898, No. 3,333; in Austria, dated September 23, 1898; in Hungary, dated September 23, 1898; in Russia, dated September 29, 1898; in Sweden, dated September 23, 1898; in Norway, dated September 23, 1898; in Denmark, dated September 23, 1898; in France, dated September 23, 1898; in Italy, dated September 23, 1898; in Spain, dated September 23, 1898, and in Portugal, dated September 23, 1898,) of which the following is a specification.

This invention consists in the application of a new and improved means permitting the extraction of alumina contained in bauxite, kaolin, clays, silicates, and other aluminous ores by the aid of sulphurous acid, said ores resisting attack by this acid even after previous calcination.

According to this invention the ore is first crushed, a certain proportion of sulphureted materials is added, and the mixture is brought to a suitable temperature in an oven. The sulphurous materials which give the best practical results are those with a basis of alkaline metals—that is to say, the sulphides of these metals, which can be substituted by equivalent mixtures of sulphate and carbon which originate during the heating. The disaggregation is of course more rapid when the heating is operated with direct addition of sulphides. As addition of sulphureted material only about ten per cent. of the weight of which is in the aluminous material. Thus, for instance, for a kaolin with thirty-five per cent. of aluminum about ten per cent. of alkaline sulphides will be added or the mixture of sulphate and carbon equivalent to the latter.

This new process shows only apparently some analogy with the process of manufacturing alkaline or alkaline earthy aluminates, as its essential purpose is to produce the disaggregation of the aluminous material, not the transformation of its alumina into aluminate, as the proportion of sulphureted material added is much less than the one necessary for the production of aluminates and the temperature of calcination remains considerably below the one that would be required for the formation of an aluminate. After calcination under these conditions the aluminous materials which resisted attack by sulphurous acid have become capable of easy attack by that acid. For instance, when operating upon bauxite in accordance with its yield of aluminum, which may vary from fifty to sixty per cent., it will be sufficient to add about ten per cent. of its weight of sulphide of sodium or the equivalent quantity of the mixture of sulphate of soda and carbon necessary for this reduction. This proportion will decrease if the ores are poorer in aluminum, and in order to accelerate and facilitate the reactions a small quantity of fluxes can be used—for instance, alkaline chlorides.

In order to give the general operation of the process based on an example, the following operation takes place: After having crushed the bauxite and having mixed it intimately with about ten per cent. of its weight of sulphide of sodium or an equivalent mixture of sulphate of sodium and carbon the whole is brought to a dark-red heat in a reverberating furnace, and after a heating maintained for about two hours at dark-red heat we have obtained a disaggregated mass containing the alkaline salts principally in the form of sulphide when sulphide of sodium was employed and in the form of sulphide and sulphate when the equivalent mixtures of sulphate and carbon were employed. Moreover, sea-salt will be found when it has been added as flux. As soluble alumina only excessively-slight quantities are found, which furnishes the proof that it is not the question of a process for manufacturing aluminates. The mass coming out of the furnace is treated with water to extract therefrom by lixiviation all alkaline salts, so as to utilize them at the renewal of the operation after the solutions have been evaporated to dry state. The residue of this washing operation, which contains all the aluminum of the ore, with all impurities—such as iron, silica, &c.—has been subjected to the action of sulphurous gas, which can be effected in several ways, the best being to treat these materials previously placed in suspension in the water methodically by a current of anhydride sulphurous gas from some source whatever. The alumina dissolves rapidly in the form of sulphite. By rest, decantation, or filtration the liquors are separated from the insoluble residues holding the impurities. These liquors are heated, sulphurous gas develops, and a precipitate of basic aluminum salt forms, which is in turn separated by decantation or filtration. The precipitate is gathered, desiccated, and then lightly calcined. It leaves pure alumina and yields sulphurous gas, which can be gathered with the sulphurous gas of the sulphite solution to be used again in the attack of the residues or in any other manner.

I claim as my invention—

The herein-described process for extracting alumina from aluminous ores which resist attack wholly or partially by sulphurous acid consisting in mixing with the previously-crushed ore a quantity of sulphureted compounds of alkaline metals smaller than would be necessary for forming aluminates, heating the mixture to dark-red heat in a suitable furnace and submitting the mass issuing from the furnace to a lixiviation and thereafter to the action of a current of sulphurous-acid gas in combination with water, separating the solutions holding alumina from the residue containing impurities, heating thereafter these solutions and calcining the precipitate obtained which yields alumina and sulphurous gas $(SO_2)$.

In witness whereof I have hereunto set my hand in presence of two witnesses.

EMILE RAYNAUD.

Witnesses:
W. T. E. KIRKPATRICK,
C. FANIEL.